(12) United States Patent
Kajiki et al.

(10) Patent No.: US 7,507,348 B2
(45) Date of Patent: *Mar. 24, 2009

(54) REFRIGERATION LUBRICANT COMPOSITION

(75) Inventors: Takeshi Kajiki, Hyogo (JP); Munehiro Yamada, Hyogo (JP); Nobuhiko Shizuka, Hyogo (JP)

(73) Assignee: NOF Corporation, Tokyo (JP)

(*) Notice: Subject to any disclaimer, the term of this patent is extended or adjusted under 35 U.S.C. 154(b) by 81 days.

This patent is subject to a terminal disclaimer.

(21) Appl. No.: 11/440,688

(22) Filed: May 25, 2006

(65) Prior Publication Data

US 2006/0278845 A1    Dec. 14, 2006

(30) Foreign Application Priority Data

May 27, 2005    (JP)  .............................. 2005-156070

(51) Int. Cl.
    *C09K 5/04*      (2006.01)

(52) U.S. Cl. ........................................ 252/68; 508/452

(58) Field of Classification Search ................... 252/68; 508/452

See application file for complete search history.

(56) References Cited

U.S. PATENT DOCUMENTS 5,498,356 A * 3/1996 Kamakura et al. .......... 508/495
5,833,876 A * 11/1998 Schnur et al. ................. 252/68
6,621,274 B2 * 9/2003 Wallmark .................... 324/501

FOREIGN PATENT DOCUMENTS

| EP | 0 913 457 A2 | 5/1999 |
| JP | 10-8084 A | 6/1996 |
| JP | 11-228984 A | 8/1999 |

\* cited by examiner

*Primary Examiner*—John R Hardee
(74) *Attorney, Agent, or Firm*—The Webb Law Firm

(57) ABSTRACT

The present invention provides a refrigeration lubricant composition that have necessary properties such as compatibility with a hydrofluorocarbon refrigerant, thermal stability, hydrolytic stability and low-temperature fluidity, and good lubricity, and has high stability under low temperature conditions so that crystals are prevented from being precipitated over a long term. The refrigeration lubricant includes an ester obtained from a mixed alcohol and a mixed carboxylic acid, wherein the mixed alcohol consists of 65 to 99.95 mol % of pentaerythritol and 0.05 to 35 mol % of dipentaerythritol, the mixed carboxylic acid consists of n-pentanoic acid, n-heptanoic acid, and isononanoic acid, the molar ratio of the n-pentanoic acid to the n-heptanoic acid is 0.3 or more and 10 or less, and the isononanoic acid is contained in the mixed carboxylic acid at a ratio of 10 mol % or more and 45 mol % or less.

3 Claims, No Drawings

REFRIGERATION LUBRICANT COMPOSITION

BACKGROUND OF THE INVENTION

1. Field of the Invention

The present invention relates to a refrigeration lubricant composition that has a polyol ester as a main component and has excellent long-term low-temperature stability and lubricity, and a refrigerant working fluid consisting of the composition and a chlorine-free hydrofluorocarbon refrigerant, and a refrigerating apparatus employing the composition.

2. Description of the Related Art

Conventionally, refrigerants containing chlorofluorocarbon have been used for air conditioning equipment such as room air conditioners and packaged air conditioners, low temperature apparatuses such as refrigerator-freezers for home use, industrial refrigerators, and automotive air conditioners such as hybrid cars and electric cars. However, due to problems such as depletion of the ozone layer, the replacement of such chlorofluorocarbon refrigerants with chlorine-free hydrofluorocarbon refrigerants such as those containing 1,1,1,2-tetrafluoroethane (R-134a), pentafluoroethane (R-125), difluoroethane (R-32), and mixtures thereof has been promoted. Consequently, a variety of refrigeration lubricants containing a polyol ester, which has good compatibility with chlorine-free hydrofluorocarbon refrigerants, as a base stock have been proposed.

In view of hydrolytic stability and compatibility with chlorine-free hydrofluorocarbon refrigerants, hindered esters having excellent thermal resistance have been put to practical use for refrigeration lubricants. These hindered esters are derived from a carboxylic acid having a methyl branched chain or ethyl branched chain in the $\alpha$ position or $\beta$ position and pentaerythritol. For example, Japanese Laid-Open Patent Publication No. 10-8084 discloses refrigeration lubricants having an ester comprising pentaerythritol and a mixed monocarboxylic acid of 2-ethylhexanoic acid and 3,5,5-trimethylhexanoic acid as a main component and discloses that such refrigerants have good stability at high temperatures.

In recent years, energy saving is required also from the viewpoint of environmental problems, and therefore a demand for improving lubricity has become greater and greater than ever. Although esters derived from straight-chain monocarboxylic acids are known as esters that provide a high lubricating effect, such esters have disadvantages in that they tend to be crystallized at low temperatures.

Japanese Laid-Open Patent Publication No. 11-228984 discloses refrigeration lubricants that comprises an ester that can be obtained using raw materials made of a combination of straight-chain monocarboxylic acid and branched chain monocarboxylic acid have excellent lubricity. However, this lubricant is not sufficient to solve the problem that crystals occur at low temperatures, either.

In the refrigeration cycle, a part of the refrigeration lubricant generally circulates through the cycle along with a refrigerant, and thus the refrigeration lubricant is exposed to a high temperature region and a low temperature region. When the refrigeration lubricant is crystallized in a low temperature region, the amount of the circulating refrigerant in the refrigeration cycle is reduced, which may lead to problems such as poor cooling. Therefore, such high stability that prevents crystals from being precipitated over a long time at low temperatures is required for refrigeration lubricants. That is, to develop polyol ester as a refrigeration lubricant, there is a demand for long-term stability at low temperature along with improvement of lubricity, and it is very important to attain these two contradicting performances at high levels.

Thus, there is a demand for development of refrigeration lubricants having good lubricity and having high stability that prevents the refrigeration lubricant from being precipitated for a long term at low temperatures.

SUMMARY OF THE INVENTION

It is an object of the present invention to provide a refrigeration lubricant composition comprising a polyol ester that has excellent properties necessary as a refrigeration lubricant that have been conventionally examined such as compatibility with hydrofluorocarbon refrigerants, thermal stability, hydrolytic stability, low temperature fluidity and further that achieves a high level of lubricity and low temperature stability over a long term (property that crystals are not precipitated at a low temperature over a long term).

It is another object of the present invention to provide a refrigerant working fluid comprising the refrigeration lubricant composition.

It is yet another object of the present invention to provide a refrigerant compression type refrigerating apparatus employing the refrigeration lubricant composition.

The inventors of the present invention conducted in-depth research with an aim of developing polyol esters that has good lubricity and long-term low temperature stability that prevents crystals from being precipitated for a long term at a low temperature, and can be used favorably as refrigeration lubricants. As a result, the inventors succeeded in attaining high lubricity and low temperature stability for a long term by using pentaerythritol and dipentaerythritol at a predetermined ratio as raw material alcohol of the ester, and combining n-pentanoic acid, n-heptanoic acid and isononanoic acid at a specific ratio as raw material monocarboxylic acid of the ester, and thus achieved the present invention.

The refrigeration lubricant composition of the present invention comprises an ester obtained from a mixed alcohol and a mixed carboxylic acid as a main component, wherein the mixed alcohol consists of 65 to 99.95 mol % of pentaerythritol and 0.05 to 35 mol % of dipentaerythritol, the mixed carboxylic acid consists of n-pentanoic acid, n-heptanoic acid, and isononanoic acid, the molar ratio of the n-pentanoic acid to the n-heptanoic acid is 0.3 or more and 10 or less, and the isononanoic acid is contained in the mixed carboxylic acid at a ratio of 10 mol % or more and less than 45 mol %.

In a preferred embodiment, an average number of carbon atoms in a main chain of the mixed carboxylic acid that is calculated based on the molar ratio of the n-pentanoic acid, n-heptanoic acid and isononanoic acid in the mixed carboxylic acid, and an average number of hydroxyl groups of the mixed alcohol that is calculated based on the molar ratio of the pentaerythritol and dipentaerythritol in the mixed alcohol satisfy the following relation:

$$1.2 \leq \frac{\text{Average number of carbon atoms in a main chain of the mixed carboxylic acid}}{\text{Average number of hydroxyl groups of the mixed alcohol}} \leq 1.5$$

The refrigerant working fluid of the present invention consists of the refrigeration lubricant composition and a chlorine-free hydrofluorocarbon refrigerant.

The refrigerant compression type refrigerating apparatus comprises at least a compressor, a condenser, an expansion mechanism, an evaporator, and the above mentioned refrigerant working fluid.

The refrigeration lubricant composition of the present invention has good lubricity and high stability under low temperature conditions so that crystals are not precipitated for a long term. Furthermore, it also has excellent properties necessary as a refrigeration lubricant such as compatibility with chlorine-free hydrofluorocarbon refrigerants, thermal resistance, and hydrolytic stability. Therefore, this composition can be made into a refrigerant working fluid by being combined with a chlorine-free hydrofluorocarbon refrigerant. The refrigerant compression type refrigerating apparatus of the present invention can maintain high cooling efficiency for a long period and thus has high reliability because it employs the composition of the present invention.

DETAILED DESCRIPTION OF THE INVENTION

Hereinafter, an ester contained in the composition of the present invention, a refrigeration lubricant composition containing the ester, a refrigerant working fluid containing the composition, and a refrigerant compression type refrigerating apparatus employing the refrigerant working fluid will be described.

(I) Ester

The ester that is a main component of the refrigeration lubricant composition of the present invention is a mixed polyol ester obtained from two kinds of alcohols (mixed alcohol) and three kinds of carboxylic acids (mixed carboxylic acids). The mixed alcohol consists of 65.0 to 99.95 mol % of pentaerythritol and 0.05 to 35 mol % of dipentaerythritol. The content of pentaerythritol in the mixed alcohol is preferably 70 to 99.95 mol %, more preferably 75 to 99.95 mol %, and the content of dipentaerythritol is preferably 0.05 to 30 mol %, more preferably 0.05 to 25 mol %.

It is preferable that pentaerythritol is a main component in the mixed alcohol for preparing the ester. However, an ester constituted by a single component of pentaerythritol has a high crystallinity and tends to be solidified under low temperature conditions. Nevertheless, by combining pentaerythritol and dipentaerythritol in a predetermined ratio as described above, the crystallinity of the obtained ester is reduced, and the long-term low-temperature stability is improved. When the content of dipentaerythritol is less than 0.05 mol %, the long-term low-temperature stability of the obtained ester is insufficient, and when it exceeds 35 mol %, the compatibility with hydrofluorocarbon becomes low.

The mixed carboxylic acid consists of n-pentanoic acid, n-heptanoic acid and isononanoic acid. The molar ratio of the n-pentanoic acid to the n-heptanoic acid is 0.3 or more and 10 or less. The isononanoic acid is contained in the mixed carboxylic acid at a ratio of 10 mol % or more and less than 45 mol %.

Examples of the isononanoic acid include 2,5,5-trimethylhexanoic acid, 3,5,5-trimethylhexanoic acid, 4,5,5-trimethylhexanoic acid, 2,2,4,4-tetramethylpentanoic acid, 2-ethyl-4,4-dimethylpentanoic acid, 6,6-dimethylheptanoic acid, 4-ethyl-2-methylhexanoic acid, 2-methyloctanoic acid, and 2-ethylheptanoic acid. Among them, 3,5,5-trimethylhexanoic acid, 2,5,5-trimethylhexanoic acid, 4,5,5-trimethylhexanoic acid, and 6,6-dimethylheptanoic acid are preferable, and 3,5,5-trimethylhexanoic acid is particularly preferable.

The n-pentanoic acid as mentioned above provides the obtained ester with good long-term low-temperature stability, however, if it is excessive, the lubricity of the resultant ester becomes poor, so that the lubricating performance as an refrigeration lubricant cannot be satisfied. The n-heptanoic acid as mentioned above provides high lubricity, however, if it is excessive, the low-temperature stability becomes poor. Therefore, the molar ratio of the n-pentanoic acid to the n-heptanoic acid is preferably 0.3 or more and 10 or less, as described above. The molar ratio is more preferably 0.4 or more and 8 or less. It is important to set to such a ratio in order to obtain high lubricity and long-term low-temperature stability.

The isononanoic acid is contained in the mixed carboxylic acid at a ratio of 10 mol % or more and less than 45 mol %. The isononanoic acid is preferably contained at a ratio of 10 mol % or more and 40 mol % or less, more preferably 10 mol % or more and 35 mol %. When the isononanoic acid is contained at a ratio of 10 mol % or more, the long-term low-temperature stability and the hydrolytic stability of the ester are improved, but when the content is 45 mol % or more, the lubricity is reduced. Therefore, the amount of the isononanoic acid is preferably 10 mol % or more and less than 45 mol % in view of low-temperature stability and hydrolytic stability.

The average number of carbon atoms in the main chain of the mixed carboxylic acid that is calculated based on the molar ratio of the n-pentanoic acid, n-heptanoic acid and isononanoic acid in the mixed carboxylic acid, and the average number of hydroxyl groups of the mixed alcohol that is calculated based on the molar ratio of the pentaerythritol and dipentaerythritol in the mixed alcohol preferably satisfy the following relation:

$$1.2 \leq \frac{\text{Average number of carbon atoms in a main chain of the mixed carboxylic acid}}{\text{Average number of hydroxyl groups of the mixed alcohol}} \leq 1.5$$

Regarding the carboxylic acid as above, "number of carbon atoms in the main chain" refers to a number of carbon atoms of a carboxylic acid excluding the carbon atoms in the branched chain structure. For example, in the case of n-pentanoic acid, which is a straight chain carboxylic acid having 5 carbon atoms, the number of carbon atoms in the main chain of the carboxylic acid is 5, and in the case of 2,5,5-trimethylhexanoic acid, which is a carboxylic acid having a branched structure with 9 carbon atoms, the number of carbon atoms in the main chain of the carboxylic acid is 6, which is obtained by subtracting 3, which is a total number of carbon atoms of branched chains (three methyl groups). Therefore, the "average number of carbon atoms in the main chain" refers to the average number of carbon atoms in the main chain calculated in view of the molar ratio of the carboxylic acids contained in the mixed carboxylic acids.

When the ratio of the average number of carbon atoms in the main chain of the mixed carboxylic acid and the average number of hydroxyl groups of the mixed alcohol is less than 1.2, the lubricity of the obtained ester becomes insufficient, and when it is more than 1.5, the long-term low-temperature stability becomes poor.

The ester that is the main component of the refrigeration lubricant composition of the present invention can be produced by conventional esterification reaction or transesterification. The ratio of the above-described mixed alcohol and the above-described mixed carboxylic acid is determined as appropriate such that the resultant mixed ester has a hydroxyl value of 5.0 mgKOH/g or less and an acid value of 0.05 mgKOH/g or less. The hydroxyl value is preferably 3.0 mgKOH/g or less, more preferably 2.0 mgKOH/g or less, and most preferably 1.0 mgKOH/g or less. Regarding the acid value, the lower is better, and it is preferably 0.03 mgKOH/g or less, and more preferably 0.01 mgKOH/g or less.

The ester used in the present invention can be obtained specifically in the following manner. First, a mixed carboxylic acid is mixed with a mixed alcohol such that the mixed carboxylic acid is preferably 1.0 to 1.5 equivalents, more preferably 1.05 to 1.3 equivalents in view of production efficiency and economic efficiency, with respect to one equivalent of hydroxyl group in the mixed alcohol, and then a catalyst is added thereto, if necessary. This mixture is reacted for 3 to 15 hours at 160 to 260° C. under a nitrogen, and at the point when the hydroxyl value becomes 3.0 mgKOH/g or less, excess carboxylic acid is removed under a reduced pressure. Then, after neutralization with an alkali, operations such as adsorption treatment using activated clay, acid clay, and a synthesized adsorbent and steaming are performed either alone or in combination. In this manner, the ester can be obtained.

(II) Refrigeration Lubricant Composition

The refrigeration lubricant composition of the present invention contains the above-described ester preferably in 80 wt % or more, more preferably 90 wt % or more, and in addition to that, may contain other esters, an additive or the like, as long as the performance of the present invention is not impaired.

Examples of other esters include esters containing neopentyl polyol having 5 to 10 carbon atoms and a monocarboxylic acid having 5 to 10 carbon atoms.

Examples of additives include a phenol antioxidant, a metal deactivator such as benzotriazole, thiadiazole, and dithiocarbamate, an acid scavenger such as epoxy compounds and carbodiimides, and a phosphorous extreme pressure agent. The additive is contained in any ratio.

There is no particular limitation regarding the kinematic viscosity of the refrigeration lubricant composition of the present invention. In view of superior lubricity and compatibility with chlorine-free hydrofluorocarbon refrigerants and energy-saving properties, the kinematic viscosity at 40° C. is preferably 24 to 100 mm$^2$/s, and more preferably 26 to 80 mm$^2$/s.

(III) Refrigerant Working Fluid

The refrigerant working fluid of the present invention consists of the above-described refrigeration lubricant composition and a chlorine-free hydrofluorocarbon refrigerant. There is no particular limitation regarding the content ratio between the refrigeration lubricant composition and the chlorine-free hydrofluorocarbon refrigerant, but the weight ratio of the refrigeration lubricant composition and the chlorine-free hydrofluorocarbon refrigerant is preferably from 10:90 to 90:10. When the weight ratio of the chlorine-free hydrofluorocarbon refrigerant is higher than the above-mentioned range, viscosity of the resultant refrigerant working fluid is reduced, and may cause poor lubrication. The amount of the chlorine-free hydrofluorocarbon refrigerant in the refrigerant working fluid is preferably 80 wt % or less. When the amount of the chlorine-free hydrofluorocarbon refrigerant is less than 10 wt %, the refrigerating efficiency may deteriorate when the obtained refrigerant working fluid is used in equipment.

Examples of the chlorine-free hydrofluorocarbon refrigerant include 1,1,1,2-tetrafluoroethane (R-134a), pentafluoroethane (R-125), difluoroethane (R-32), trifluoroethane (R-23), 1,1,2,2-tetrafluoroethane (R-134), 1,1,1-trifluoroethane (R-143a), and 1,1-difluoroethane (R-152a). These refrigerants may be used either alone or as mixed refrigerant in combination of two or more thereof.

The above-mentioned mixed refrigerants are commercially available, and, for example, R-407C (R-134a/R-125/R-32=52/25/23 wt %), R-410A (R-125/R-32=50/50 wt %), R-404A (R-125/R-143a/R-134a =44/52/4 wt %), R-407E (R-134a/R-125/R-32=60/15/25 wt %), and R-410B (R-32/R-125=45/55 wt %) are used. Among these, mixed refrigerants containing at least one of R-134a and R-32 are particularly preferable.

(IV) Refrigerant Compression Type Refrigerating Apparatus

The refrigerant compression type refrigerating apparatus of the present invention is provided with at least a compressor, a condenser, an expansion mechanism, and an evaporator and is configured such that the above-described refrigerant working fluid, which is the refrigerant in the refrigerating apparatus, circulates through these components. This refrigerating apparatus may further include a drier. Examples of such a refrigerating apparatus include air conditioning equipment such as room air conditioners and packaged air conditioners; low temperature apparatuses; industrial refrigerators; and automotive air conditioners such as hybrid cars and electric cars.

EXAMPLES

Hereinafter, the present invention will be described in detail by way of examples, but the present invention is not limited thereto.

The methods for testing esters produced in the examples and the comparative examples of the present invention will be described below:

<Kinematic viscosity and viscosity index> The kinematic viscosity is measured according to JIS K-2283.

<Acid value> The acid value is measured according to JIS C-2101.

<Hydroxyl value> The hydroxyl value is measured according to JIS K-0070.

<Two-phase separation temperature> First, 0.6 g of a sample (ester) and 2.4 g of a refrigerant R-134a or R-407C were enclosed in a thick PYREX (registered trademark) tube (total length of 300 mm, outer diameter of 10 mm, and inner diameter of 6 mm) that is preliminary cooled in dry ice-ethanol, and cooled at a rate of 1° C./min. Then, and the two-phase separation temperatures at low temperature were measured visually within a temperature range from −50° C. to +20° C.

<Pour point> The pour point is measured according to JIS K-2269.

<Color number (APHA)> The color number (APHA) is measured according to JOCS 2.2.1.4-1996.

<Long-term low-temperature test> First, 400 g of a sample (ester), moisture content of which was adjusted to 100 ppm or less, is placed in a square can made of steel and allowed to stand for 1000 hours in a low temperature storage apparatus at −30° C., and then checked visually to determine whether or not crystals are precipitated.

<Sealed tube test> First, 10 g of a sample (ester), moisture content of which was adjusted to 200 ppm or less, 5 g of hydrofluorocarbon R-410A, and one each of iron, copper, and aluminum metal pieces having a diameter of 1.6 mm and a length of 50 mm are put in a glass tube. Then, the glass tube is sealed, and is heated at 175° C. for 14 days, and then the acid value and the color number (APHA) of the fluorocarbon-containing sample from which the metal pieces were removed are measured.

<Falex friction test> The Falex friction test was performed according to ASTM D-2670 while blowing R-134a into a sample (ester) at a rate of 150 ml/min in the following manner. First, the temperature of the sample (ester) is set at 100° C., and a trial operation under a load of 150 pounds is carried out for one minute, followed by an operation under a load of 300 pounds for one hour. After the operation, the wear amount of the pin is measured.

Example 1.1

Preparation of Ester

First, alcohols and carboxylic acids shown in Table 1 were placed in a one-liter four-necked flask provided with a thermometer, a nitrogen inlet tube, a stirrer and a cooling tube such that the ratio of the hydroxyl group in the alcohol to the carboxyl group in the carboxylic acid was 1:1.1 in the equivalent ratio, and then reacted under a nitrogen at 160° C. for 6 hours, followed by a reaction at an atmospheric pressure while water generated by the reaction was removed by distillation at 220° C. During the reaction, the hydroxyl value of the reaction mixture was monitored, and the reaction was stopped at the point when the hydroxyl value became lower than 2.0 mgKOH/g. Then, stripping was performed under a reduced pressure of 1 to 5 kPa to remove unreacted carboxylic acid for one hour. The resultant reaction mixture was neutralized with an aqueous solution of potassium hydroxide. Washing of the resultant ester with water was repeated five times so that the pH of the discharged water became neutral. Then, the resultant ester layer was dehydrated at 100° C. under a reduced pressure of 1 kPa, and acid clay and a silica-alumina adsorbent were added thereto for an adsorption treatment such that each amount of them becomes 1.0 wt % of the theoretical production amount of an ester. The temperature, pressure, and time of the adsorption treatment were 100° C., 1 kPa, and 3 hours, respectively. Thereafter, the mixture was filtrated using a one-micron filter, and thus an ester (which is referred to as "ester A") was obtained. The kinematic viscosity at 40° C. and 100° C., viscosity index, color number (APHA), acid value, and hydroxyl value of the obtained ester A were measured according to the above-described method. Table 1 shows the results. Table 1 also shows the results of Examples 1.2 to 1.5 and Comparative Examples 1.1 to 1.6, which will be described later.

Examples 1.2 to 1.5

Esters (i.e., esters B to E) were obtained in the same manner as in Example 1 except that the alcohols and the carboxylic acids shown in Table 1 were used. The kinematic viscosity at 40° C. and 100° C., viscosity index, color number (APHA), acid value, and hydroxyl value of each ester were measured according to the above-described method.

Comparative Examples 1.1 to 1.7

Esters (i.e., esters F to L) were obtained in the same manner as in Example 1 except that the alcohols and the carboxylic acids shown in Table 1 were used. The kinematic viscosity at 40° C. and 100° C., viscosity index, color number (APHA), acid value, and hydroxyl value of each ester were measured according to the above-described method.

TABLE 1

| | Ester | Alcohol (mol %) | Carboxylic acid (mol %) | nC5/nC7[a] | Ratio of number of carbon atoms[b] | Kinematic viscosity (mm$^2$/s) 40° C. | 100° C. | Viscosity index | Color number (APHA) | Acid value | Hydroxyl value (mgKOH/g) |
|---|---|---|---|---|---|---|---|---|---|---|---|
| Ex. 1.1 | A | PE (90) diPE (10) | n-Pentanoic acid (70) n-Heptanoic acid (20) 3,5,5-Trimethylhexanoic acid (10) | 3.50 | 1.31 | 24 | 9.6 | 191 | 55 | <0.01 | 0.1 |
| Ex. 1.2 | B | PE (95) diPE (5) | n-Pentanoic acid (40) n-Heptanoic acid (40) 3,5,5-Trimethylhexanoic acid (20) | 1.00 | 1.46 | 29 | 11.2 | 184 | 62 | <0.01 | 0.3 |
| Ex. 1.3 | C | PE (99.5) diPE (0.5) | n-Pentanoic acid (67) n-Heptanoic acid (10) 3,5,5-Trimethylhexanoic acid (23) | 6.70 | 1.35 | 32 | 5.2 | 83 | 58 | <0.01 | 0.1 |
| Ex. 1.4 | D | PE (90) diPE (10) | n-Pentanoic acid (40) n-Heptanoic acid (30) 3,5,5-Trimethylhexanoic acid (30) | 1.30 | 1.40 | 39 | 6.3 | 110 | 65 | <0.01 | 0.2 |
| Ex. 1.5 | E | PE (90) diPE (10) | n-Pentanoic acid (20) n-Heptanoic acid (40) 3,5,5-Trimethylhexanoic acid (40) | 0.50 | 1.48 | 46 | 7.2 | 115 | 69 | <0.01 | 0.5 |
| Com. Ex. 1.1 | F | PE (99) diPE (1) | n-Pentanoic acid (10) n-Heptanoic acid (80) 3,5,5-Trimethylhexanoic acid (10) | 0.10 | 1.67 | 25 | 4.8 | 114 | 52 | <0.01 | 0.6 |
| Com. Ex. 1.2 | G | PE (100) | n-Pentanoic acid (40) n-Heptanoic acid (40) 3,5,5-Trimethylhexanoic acid (20) | 1.00 | 1.50 | 28 | 5.1 | 112 | 55 | <0.01 | 0.2 |

TABLE 1-continued

| | | Alcohol | | | Ratio of number of | Kinematic viscosity (mm²/s) | | Viscosity index | Color number (APHA) | Acid value | Hydroxyl value |
|---|---|---|---|---|---|---|---|---|---|---|---|
| | Ester | (mol %) | Carboxylic acid (mol %) | nC5/nC7[a] | carbon atoms[b] | 40° C. | 100° C. | | | (mgKOH/g) | |
| Com. Ex. 1.3 | H | PE (99.5) diPE (0.5) | n-Pentanoic acid (65) n-Heptanoic acid (5) 3,5,5-Trimethylhexanoic acid (30) | 13.00 | 1.35 | 32 | 5.6 | 114 | 50 | <0.01 | 0.3 |
| Com. Ex. 1.4 | I | PE (90) diPE (10) | n-Pentanoic acid (60) 3,5,5-Trimethylhexanoic acid (40) | — | — | 48 | 6.9 | 75 | 52 | <0.01 | 0.4 |
| Com. Ex. 1.5 | J | PE (100) | 2-Ethylhexanoic acid (30) 3,5,5-Trimethylhexanoic acid (70) | — | — | 82 | 9.3 | 87 | 45 | <0.01 | 0.2 |
| Com. Ex. 1.6 | K | PE (100) | 3,5,5-Trimethylhexanoic acid (100) | — | — | 110 | 11.1 | 83 | 30 | <0.01 | 0.3 |
| Com. Ex. 1.7 | L | PE (55) diPE (45) | n-Pentanoic acid (20) n-Heptanoic acid (40) 3,5,5-Trimethylhexanoic acid (40) | 0.50 | 1.27 | 60 | 8.9 | 119 | 55 | <0.01 | 0.3 |

[a] Molar ratio of n-pentanoic acid and n-heptanoic acid
[b] Ratio of average number of carbon atoms in the main chain of the carboxylic acid and average number of hydroxyl groups of the alcohol Example 2.1

The ester A was used as a refrigeration lubricant. Regarding this lubricant, pour point and two-phase separation temperature were measured according to the above-described methods. Furthermore, the long-term low temperature stability test and sealed tube test were performed. Furthermore, the wear amount of a pin was measured according to the above-described Falex friction test. Table 2 shows the results. Table 2 also shows the results of Examples 2.2 to 2.5 and Comparative Examples 2.1 to 2.7, which will be described later.

Examples 2.2 to 2.5

The esters B to E were used as refrigeration lubricants, and measurement and tests were performed in the same manner as Example 2.1.

Comparative Examples 2.1 to 2.7

The esters F to L were used as refrigeration lubricants, and measurement and tests were performed in the same manner as Example 2.1.

TABLE 2

| | | Pour point (° C.) | Two-phase separation temperature (° C.) | | Long-term low-temp. stability test[a] | Sealed tube test | | Falex friction test Pin wear amount (mg) |
|---|---|---|---|---|---|---|---|---|
| | Ester | | R-134a | R-407C | | Color number (APHA) | Acid value (mgKOH/g) | |
| Ex. 2.1 | A | <−50 | <−50 | <−50 | − | 58 | 0.11 | 8 |
| Ex. 2.2 | B | −47.5 | −41 | −31 | − | 70 | 0.10 | 7 |
| Ex. 2.3 | C | <−50 | <−50 | <−50 | − | 65 | 0.08 | 9 |
| Ex. 2.4 | D | <−50 | −41 | −32 | − | 83 | 0.07 | 6 |
| Ex. 2.5 | E | −33.0 | −24 | −16 | − | 88 | 0.06 | 6 |
| Com. Ex. 2.1 | F | −40.0 | −5 | 1 | + | 68 | 0.12 | 4 |
| Com. Ex. 2.2 | G | −50.0 | −39 | −32 | + | 63 | 0.10 | 8 |
| Com. Ex. 2.3 | H | <−50 | <−50 | <−50 | − | 85 | 0.09 | 15 |
| Com. Ex. 2.4 | I | <−50 | <−50 | <−50 | − | 83 | 0.05 | 18 |
| Com. Ex. 2.5 | J | −37.5 | −20 | −15 | + | 56 | 0.03 | 17 |
| Com. Ex. 2.6 | K | −22.5 | −20 | −16 | + | 58 | 0.03 | 16 |
| Com. Ex. 2.7 | L | −30.0 | −6 | −1 | − | 63 | 0.05 | 8 |

[a] The indication "−" denotes that no precipitation occurs, and the indication "+" denotes that precipitation occurs when held at −30° C. for 1000 hours.

As is evident from Table 2, the lubricants employing the compositions of the present invention have excellent fluidity and excellent long-term low-temperature stability. On the other hand, the lubricants employing the compositions of Comparative Examples containing esters in which the raw material mixed alcohols or carboxylic acids do not satisfy the requirements of the present invention have poor long-term low-temperature stability, or poor results of Falex tests (i.e., lubricity).

The refrigeration lubricant composition of the present invention has excellent low-temperature stability. Furthermore, it has good compatibility with hydrofluorocarbons, particularly with chlorine-free hydrofluorocarbon refrigerants, so that it is preferably used as a lubricant for refrigerators employing a chlorine-free hydrofluorocarbon refrigerant or as a refrigerant working fluid obtained by mixing this lubricant with a chlorine-free hydrofluorocarbon refrigerant. Specifically, the refrigeration lubricant composition of the present invention and the refrigerant working fluid containing a chlorine-free hydrofluorocarbon refrigerant can be used for air conditioning equipment such as room air conditioners and packaged air conditioners; low temperature apparatuses; industrial refrigerators; and compressors of automotive air conditioners such as hybrid cars and electric cars.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A refrigeration lubricant composition comprising an ester obtained from a mixed alcohol and a mixed carboxylic acid, wherein the mixed alcohol consists of 65 to 99.95 mol % of pentaerythritol and 0.05 to 35 mol % of dipentaerythritol, the mixed carboxylic acid consists of n-pentanoic acid, n-heptanoic acid, and isononanoic acid, the molar ratio of the n-pentanoic acid to the n-heptanoic acid is 0.3 or more and 10 or less, and the isononanoic acid is contained in the mixed carboxylic acid at a ratio of 10 mol % or more and less than 45 mol %, and wherein an average number of carbon atoms in a main chain of the mixed carboxylic acid that is calculated based on the molar ratio of the n-pentanoic acid, n-heptanoic acid isononanoic acid in the mixed carboxylic acid, and an average number of hydroxyl groups of the mixed alcohol that is calculated based on the molar ratio of the pentaerythritol and dipentaerythritol in the mixed alcohol satisfy the following relation:

$$1.2 \leq \frac{\text{Average number of carbon atoms in a main chain of the mixed carboxylic acid}}{\text{Average number of hydroxyl groups of the mixed alcohol}} \leq 1.5.$$

2. A refrigerant working fluid consisting of the refrigeration lubricant composition of claim 1 and a chlorine-free hydrofluorocarbon refrigerant.

3. A refrigerant compression type refrigerating apparatus comprising at least a compressor, a condenser, an expansion mechanism, an evaporator, and the refrigerant working fluid of claim 2.

* * * * *

UNITED STATES PATENT AND TRADEMARK OFFICE
CERTIFICATE OF CORRECTION

PATENT NO. : 7,507,348 B2  
APPLICATION NO. : 11/440688  
DATED : March 24, 2009  
INVENTOR(S) : Kajiki et al.

It is certified that error appears in the above-identified patent and that said Letters Patent is hereby corrected as shown below:

Title page, Item (56) References Cited, U.S. PATENT DOCUMENTS,
"6,621,274 B2*      9/2003 Wallmark     ............324/501" should read
-- 6,221,274 B1*      4/2001 Akahori et al. ..............252/68 --

Column 12, Claim 1, Line 14, "acid isonoanoic" should read
-- acid and isononanoic --

Signed and Sealed this

Fourteenth Day of July, 2009

JOHN DOLL  
*Acting Director of the United States Patent and Trademark Office*